Feb. 2, 1971  KAZUO OISHI ETAL  3,560,833
IGNITION DEVICE WITH LOW SOURCE VOLTAGE COMPENSATING CIRCUIT
Filed Dec. 3, 1968

INVENTORS
Kazuo Oishi
Tokuhiro Kurebayashi
BY Cushman, Darby & Cushman
ATTORNEYS

United States Patent Office 3,560,833
Patented Feb. 2, 1971

3,560,833
IGNITION DEVICE WITH LOW SOURCE VOLTAGE COMPENSATING CIRCUIT
Kazuo Oishi and Tokuhiro Kurebayashi, Kariya-shi, Japan, assignors to Nippon Denso Company Limited, Kariya-shi, Japan, a corporation of Japan
Filed Dec. 3, 1968, Ser. No. 780,854
Claims priority, application Japan, Nov. 30, 1968, 43/5,551
Int. Cl. F02p 3/06, 17/00; H02m 3/22
U.S. Cl. 321—2
8 Claims

ABSTRACT OF THE DISCLOSURE

A capacitor discharge type ignition device, wherein an intermediate tap is provided on a primary winding of an oscillator transformer incorporated in a DC–DC converter adapted for boosting the voltage of a storage battery, said intermediate tap and that one of the terminals of said primary winding which is on the power source side are connected with the storage battery through a switching means which are under the control of a voltage control element adapted to detect the terminal voltage of said storage battery, and when the voltage of the storage battery is lower than a predetermined value, the battery is switched to said intermediate tap thereby to prevent the drop of the output voltage from said transformer, while a reverse current from said primary winding to the storage battery being stopped by a diode.

BACKGROUND OF THE INVENTION

Field of the invention

This invention relates to an ignition device, and more particularly it pertains to improvements in a capacitor discharge type ignition device for use with automobiles.

Description of the prior art

In the conventional ignition devices of this type, it is the usual practice that use is made of a storage battery carried by an automobile. As well-known in the art, however, such automobile-carried storage battery has such a disadvantage that the terminal voltage thereof tends to be changed with ambient temperature variations so that it becomes very low at very low temperatures as during wintertime. And yet, such automobile-carried battery is used also as power source for other automobile-carried devices such as a starter motor and so forth. Thus, when the engine of an automobile is to be started at a low temperature, the battery voltage tends to drop about 7 v. which is about half the normal value (12 v.), resulting in a great decrease of the voltage across a discharging capacitor of the ignition device. Consequently, the ignition plug is not able to produce an ignition spark, and thus difficulty is encountered in smoothly starting the engine. Obviously, this constitutes a great disadvantage.

SUMMARY OF THE INVENTION

It is a primary object of the present invention to provide a capacitor discharge type ignition device, wherein an intermediate tap is provided on a primary winding of an oscillator transformer incorporated in a DC–DC converter adapted for boosting the voltage of a storage battery, said intermediate tap and that one of the terminals of said primary winding which is on the power source side are connected with the storage battery through switching means which are under the control of a voltage controlling element adapted to detect the terminal voltage of said storage battery, and the battery voltage is applied to said intermediate tap when the voltage goes below a predetermined value thereby preventing a reverse current flow from said primary winding toward the storage battery.

Another object of the present invention is to provide an ignition device which is so designed that a sufficient ignition spark can be automatically produced by the ignition plug irrespective of change in the storage battery voltage due to ambient temperature variations and/or battery load variations.

In accordance with the present invention, when the voltage of the storage battery drops, the turn ratio between the primary to the secondary winding of the oscillator transformer is automatically increased so as to induce an increased voltage across the secondary winding, thereby enabling the ignition plug to produce a sufficient ignition spark and facilitating the starting of an engine especially at low temperatures.

Other objects, features and advantages of the present invention will become apparent from the following description taken in conjunction with the accompanying drawings.

DESCRIPTION OF THE PREFERRED EMBODIMENT

Figure 1:
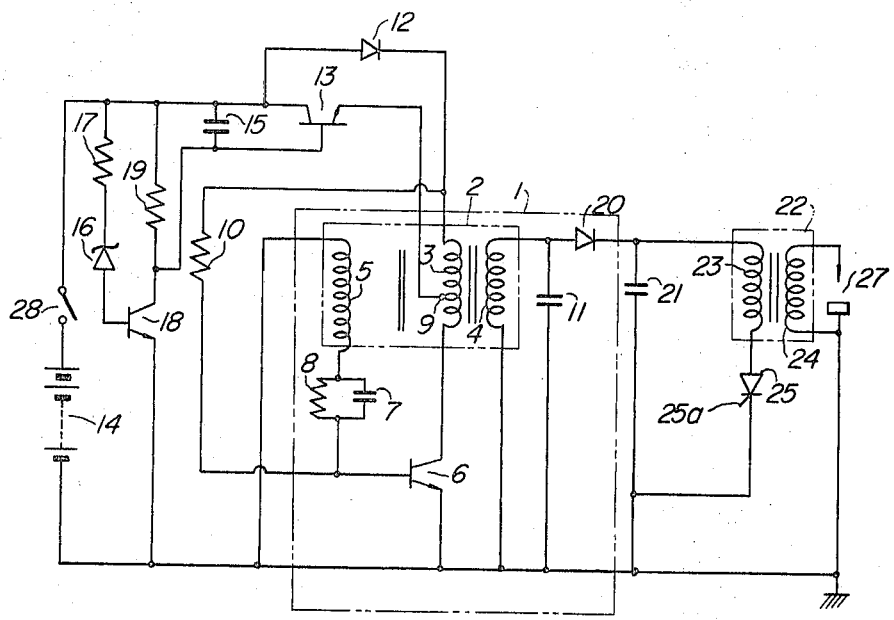
FIG. 1 is an electric connection drawing showing the ignition device according to an embodiment of the present invention.

A preferred embodiment of this invention will be described with reference to the accompanying drawings. Referring to FIG. 1, the reference numeral 1 represents a DC–DC converter, 2 an oscillator transformer, 3 a primary winding of the oscillator transformer, 4 a secondary winding thereof, 5 a feedback winding thereof, 6 an oscillator transistor, and 7 and 8 a capacitor and a resistor constituting a feedback circuit respectively. The reference numeral 9 denotes an intermediate tap provided on the primary winding 3. The reference numeral 10 indicates a bias resistor for said transistor 6, and 11 a capacitor for preventing an excessive voltage from being applied between the emitter and the collector of said transistor 6 when the latter is rendered non-conductive. The reference numeral 12 represents a reverse current preventing diode, and 13 a switching transistor. The diode 12 is connected between that one of the terminals of the primary winding 3 which is on the power source side and the storage battery 14, and the transistor 13 is connected between the intermediate tap 9 and the storage battery 14. The reference numeral 15 indicates a capacitor for suppressing an excessive voltage applied between the base and the collector of the switching transistor 13. The reference numeral 16 denotes a voltage regulator element such as a Zener diode or an avalanche diode, 17 a current-limiting resistor for limiting a current flowing through the voltage regulator diode, 18 a control transistor for controlling the switching transistor, and 19 a load resistor for the transistor 18, which constitute a voltage controlling element for detecting the terminal voltage of the storage battery 14 to thereby control a power source connection switching element. The reference numeral 20 represents a rectifying diode, 21 a discharge capacitor, 22 ignition coil means, 23 a primary winding thereof, 24 a secondary winding thereof, and 25 a switching element for controlling a current flowing through the primary winding of the ignition coils 22 and which is constituted by a silicon controlled rectifier (referred to simply as SCR hereinafter) in the present embodiment. A closed circuit is formed by the discharge capacitor 21, primary winding of the ignition coil means 22 and SCR 25. The reference 25a indicates a gate terminal of the SCR 25. The reference numeral 27 indicates an ignition plug, and 28 a power source switch. The gate terminal 25a of the SCR 25 is under the control of a signal generator which produces signal pulses at a point of time when ignition should occur.

Description will now be made of the operation of the present device having the foregoing construction. First of all, in case the normal terminal voltage of the storage battery 14 is in excess of 12 v. for example, the voltage regulator element 16 is rendered conductive upon closure of the power source switch 28, so that a base current flows through the control transistor 18 to render the transistor 18 and hence the switching transistor 13 non-conductive. Thus, no current flows in the intermediate tap provided on the primary winding 3 of the oscillator transformer 2 by way of the transistor 13. The storage battery voltage is applied to the power source side terminal of the primary winding 3 of the oscillator transformer 2 through the reverse current flow preventing diode 12, so that a bias current is supplied to the oscillator transistor 6 through the bias resistor 10 so as to render the transistor 6 conductive. As a result, a voltage is developed across the feedback winding 5, the voltage which renders the transistor 6 conductive or makes the base of the transistor 6 positive. The voltage developed across the feedback winding 5 is imparted to the base of the transistor 6 through the capacitor 7 and resistor 8 which constitute a feedback circuit. A current flowing through the primary winding 3 of the oscillator transformer 2 increases as time lapses, and when it reaches a value corresponding to the product of the base to emitter current of the transistor 6 multiplied by the amplification factor of the transistor, no more increased current can flow through the transistor 6 so that the voltage induced across the feedback winding 5 drops, resulting in the base current of the transistor 6 being also decreased. Consequently, the transistor 6 is suddenly rendered non-conductive. Since the capacitor 7 of the feedback circuit is charged during the conduction of the transistor 6, the change stored at the capacitor 7 begins to be discharged through the resistor 8 immediately after the transistor 6 is switched to the non-conductive state. During the discharge of the capacitor 7, the transistor 6 is reversely biased so as to be kept in the non-conductive state. Upon completion of the discharge, the transistor 6 is again rendered conductive. Repetition of the foregoing operation results in oscillation of the transistor 6. A high AC voltage in synchronism with the oscillation frequency is developed in the secondary winding 4 of the oscillator transformer 2, so that the discharge capacitor 21 is charged through the diode 20. When the charging of the capacitor 21 is completed and a point of time to fire the engine is reached, a gate signal pulse produced by the signal generator (not shown) is imparted to the gate terminal 25a of the SCR 25 to render the latter conductive. Thereupon, the charge stored at the discharge capacitor 21 begins to be discharged so that a discharge current flows through a path constituted by the primary winding 23 of the ignition coil means 22 and SCR 25. Then, a high voltage is induced across the secondary winding 24 of the ignition coil means 22, so that an ignition spark is produced by the ignition plug 27.

If the terminal voltage of the storage battery 14 goes below the normal value thereof, then the voltage regulator element 16 is rendered non-conductive so that the control transistor 18 is also rendered non-conductive. As a result, the switching transistor 13 is rendered conductive so that a current flows in the intermediate tap provided on the primary winding 3 of the oscillator transformer 2 through the transistor 13. Thus, the effective number of turns of the primary winding 3 is decreased substantially to half so that the turn ratio between the primary and the secondary winding of the oscillator transformer 2 becomes higher, with the result that a voltage higher than that across the primary winding by an amount corresponding to the voltage drop of the storage battery is induced in the secondary winding 4 In this way, a sufficient voltage can be charged at the discharge capacitor 21 so that it is possible to obtain the necessary energy for ignition irrespective of a great decrease in terminal voltage of the storage battery 14.

Upon connection of the storage battery to the intermediate tap 9, a current flows through the primary winding 3 between the intermediate tap 9 and that one of the terminals of the primary winding 3 which is not associated with the power source. Accordingly, a voltage is induced between the intermediate tap 9 and the power source side terminal, with the potential at the power source side terminal being positive with respect to that at the intermediate tap. However, by means of the reverse current preventing diode 12, a current resulting from said induced voltage is prevented from being short-circuited through the diode 12 and switching transistor 13, lest said short-circuit current should disturb the magnetic flux in the transformer. Therefore, the secondary voltage is not adversely affected by said voltage induced in the remaining portion of the primary winding.

Figure 2:
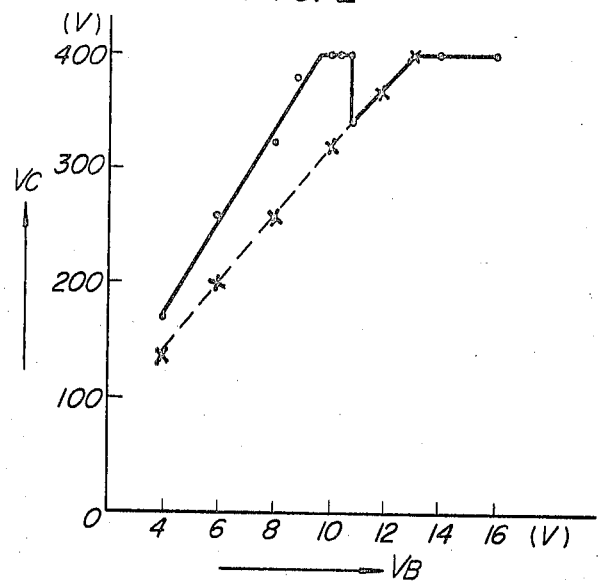
FIG. 2 is a view showing the storage battery voltage vs. discharge capacitor voltage characteristic occurring in the ignition device illustrated in FIG. 1, in comparison with similar characteristics of the conventional ignition device.

Description numerically illustrated will be made of the characteristics of the device embodying the present invention. The Zener voltage of the avalanche diode 16 was 9 v., and the numbers of turns of the primary winding 3 and secondary winding 4 of the oscillator transformer 2 were 6 and 200 respectively. The intermediate tap was provided on the primary winding 3 at the position corresponding to the third turn, and SCR 26 was so-controlled as to prevent voltage across the discharge capacitor 21 from being in excess of 400 v. Under such condition, the voltage charged at the discharge capacitor 21 was measured. As will be seen from the solid curve of FIG. 2 wherein the charged voltage $V_C$ of the capacitor 21 is indicated on the vertical axis and the terminal voltage $V_B$ of the storage battery 14 on the horizontal axis, the charged voltage of the discharge capacitor 21 reached 300 v. at which ignition can be produced irrespective of the decrease of the terminal voltage of the storage battery 14 down to 7 v. Thus, a good result was obtained. The dotted curve of FIG. 2 shows the charged voltage characteristic of the discharge capacitor with respect to the storage battery voltage of a conventional ignition device, from which it will be seen that a charged voltage such as to be able to produce ignition could not be obtained because of a decrease of the terminal voltage of the storage battery down to 9 v.

In the foregoing embodiment, a reverse current preventing diode 12 and switching transistor 13 were used as power source connection switching elements, and the circuit constituted by voltage regulator element 16, resistors 17 and 19 and control transistor 18 was employed as voltage controlling means for detecting the terminal voltage of the storage battery 14 to thereby control the aforementioned power source connection switching elements. However, it is also possible that a voltage detecting coil connected in parallel with the storage battery 14 may be used as voltage controlling elements a change-over switch may be employed as power source connection switching means, the power source side terminal of the primary winding 3 of the transformer 2 may be connected with the storage battery 14 through a normally-closed contact of the change-over switch, and the intermediate tap may be connected with the storage battery through a normally-open contact of the change-over switch, whereby the contacts of the change-over switch are switched in accordance with a change in the absorption force of the voltage detecting coil in case the terminal voltage of the storage battery goes below the normal value.

What is claimed is:

1. In a capacitor discharge type ignition device having a DC–DC converter for boosting the voltage of a storage battery, said converter including an oscillator transformer with one terminal of a primary winding normally connected to one terminal of said storage battery, the improvement comprising:
an intermediate tap provided on said primary winding of said transformer,
means for automatically detecting the voltage of said storage battery, and
means automatically responding to an output signal from said voltage detecting means for switching said one terminal of said storage battery from said one terminal of said primary winding to said intermediate tap of said primary winding when the voltage of said storage battery is lower than a predetermined value.

2. An improvement for an ignition device as defined in claim 1, wherein said means for switching comprises:
a switching element connected between said tap and said one terminal of said storage battery, and
a unidirectional diode element connected between said one terminal of said primary winding and said one terminal of said storage battery.

3. An improvement for an ignition device as defined in claim 1, wherein said voltage detecting means comprises:
a transistor connected across said storage battery in series with a resistor and a diode voltage regulator element connected between the base of said transistor and a terminal of said storage battery.

4. An improvement for an ignition device as defined in claim 1, wherein said DC–DC converter including said oscillator transformer comprises:
a feedback means,
a transistor connected to said primary winding of said transformer and to said feedback means,
said primary winding, said transistor and said feedback means constituting an oscillator circuit, and
an output rectifying means connected to a secondary winding of said transformer.

5. An ignition device for use with a DC power source having first and second source terminals, said device comprising:
a voltage detector for detecting the voltage of said power source,
a DC–DC converter including a transformer having a primary winding with first and second primary terminals and an intermediate tap, a secondary winding, an output rectifier connected to said secondary winding and a feedback winding for feeding back a voltage from said primary winding,
a first switching element automatically responsive to an output of said voltage detector and having one terminal connected to said first source terminal and another terminal connected to said intermediate tap for automatically switching said first source terminal to said intermediate tap whenever the voltage of said power source is below a predetermined level,
a first rectifying element connected between said first source terminal and said first primary terminal, and
a second switching element connected to said second primary terminal and responsive to said feedback voltage from said feedback winding for causing oscillation of said second switching element.

6. A device as in claim 5 wherein said voltage detector comprises:
a diode and a resistor connected in a series circuit for maintaining a constant voltage drop across said diode while current is flowing therethrough in a reverse direction,
a transistor having a collector connected to said first source terminal through another resistor and to a control terminal of said first switching element thereby rendering said first switching element responsive to an output of said voltage detector,
said transistor having an emitted connected to said second source terminal,
said transistor having a base connected to one terminal of said series circuit, and
said first source terminal being connected to the other terminal of said series circuit.

7. An ignition device as in claim 5 wherein said first and second switching elements are both transistors.

8. An ignition device as in claim 7 wherein the transistor constituting said second switching element has a base connected to said first rectifying element through a resistor for biasing said base.

References Cited
UNITED STATES PATENTS

| | | | |
|---|---|---|---|
| 2,959,726 | 11/1960 | Jensen | 323—43.5(S)UX |
| 3,018,432 | 1/1962 | Palmer | 320—TDUX |
| 3,300,704 | 1/1967 | McMillen | 320—TDUX |
| 3,352,295 | 11/1967 | Miki | 315—209TUX |

WILLIAM H. BEHA, JR., Primary Examiner

U.S. Cl. X.R.
123—148, 179; 315—209; 323—43.5